(No Model.)
W. H. CLARK & A. C. HANKINSON.
HARVESTER ATTACHMENT.
No. 309,203. Patented Dec. 16, 1884.
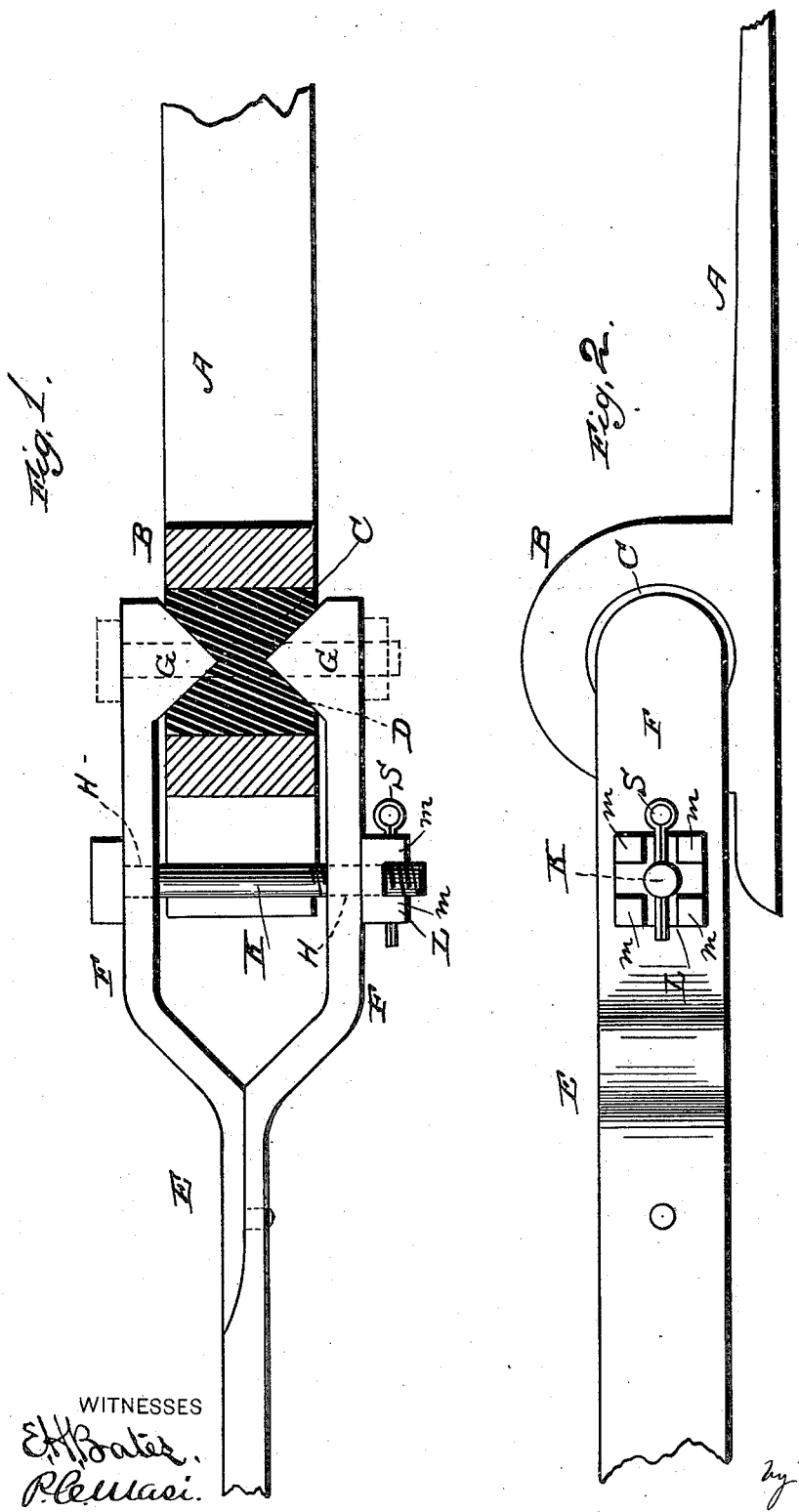
WITNESSES
INVENTORS
W. H. Clark,
A. C. Hankinson,
by Audmon & Smith
their ATTORNEYS

UNITED STATES PATENT OFFICE.

WILLIAM H. CLARK AND AMBROSE C. HANKINSON, OF HARPER, KANSAS.

HARVESTER ATTACHMENT.

SPECIFICATION forming part of Letters Patent No. 309,203, dated December 16, 1884.

Application filed May 1, 1884. (No model.)

*To all whom it may concern:*

Be it known that we, W. H. CLARK and A. C. HANKINSON, citizens of the United States, residing at Harper, in the county of Harper and State of Kansas, have invented certain new and useful Improvements in Harvester Attachments; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a longitudinal sectional view. Fig. 2 is a side view.

This invention has relation to pitman-connections of the sickles of reapers or mowing-machines; and it consists in the construction and novel arrangement of devices, as hereinafter set forth, and pointed out in the appended claim.

In the accompanying drawings, the letter A designates the head of the sickle-bar, which may be made of wrought or malleable cast-iron. It is formed with the lug B on its upper portion, said lug having welded or cast in a transverse seat made therein the chilled iron or steel plug C, which is recessed in each side to provide the lateral concave conical bearings D.

E represents the pitman, which is made with a forked end, the branches F F of which are separated sufficiently to embrace between them the lug B. The terminal portions of the branches F are provided each with an inwardly-turned cone-shaped bearing-stud, G, adapted to engage a conical bearing, D, of the lug. Through the branches of the fork of the pitman are made perforations H, and a screw-bolt, K, is passed through said perforations. This bolt is perforated near its point end, and is provided with a nut, L, having face-studs *m*, adapted to form stops for a key, S, which, after the nut is turned up on the screw sufficiently to bring the cone-points of the fork into proper engagement with the bearings of the lug, is passed through the eye in the point of the screw, holding both nut and screw in relative position. By means of this device the wear or lost motion of the points in the conical bearings can be readily taken up when necessary, and a loose and rattling joint avoided. A safety-bolt may be passed through the cone-shaped bearings G and D in some cases, when deemed advisable.

Having described this invention, what I claim, and desire to secure by Letters Patent, is—

The combination, with a sickle-head having lateral steel recess-bearings D, of conical form, of the forked pitman having its branches provided with conical studs to engage the bearings D, and a take-up screw, K, having a studded nut and key adapted to engage said nut when passed through a perforation in the point of the screw, substantially as specified.

In testimony whereof we affix our signatures in presence of two witnesses.

WILLIAM H. CLARK.
AMBROSE C. HANKINSON.

Witnesses:
JOHN BUXTON,
E. E. TAYLOR.